Feb. 28, 1967   F. WEBSTER   3,306,663
HEADING AND RIPPING MACHINES FOR MINING
Filed Sept. 24, 1964   7 Sheets-Sheet 1

Inventor
Frederick Webster
By Watson, Cole, Grindle & Watson
Attorneys United States Patent Office 3,306,663
Patented Feb. 28, 1967

3,306,663
HEADING AND RIPPING MACHINES FOR MINING
Frederick Webster, Chapeltown, Sheffield, England, assignor to Greenside Machine Company Limited
Filed Sept. 24, 1964, Ser. No. 398,954
Claims priority, application Great Britain, Oct. 2, 1963, 38,801/63
10 Claims. (Cl. 299—31)

This invention relates to mining machines of the type in which an arm extending radially from an axis running generally lengthwise of the machine carries rotary cutting means on its forward face, with means for driving the arm about that axis and means for advancing and retracting the arm in the general direction of that axis, for the presentation of the cutting means on the arm to the mineral to be extracted progressively over the whole area represented by the radius of the arm and the arc through which it can be swung with respect to the axis.

According to the present invention, a mining machine of the type referred to has a torque shaft extending in the lengthwise direction of the machine, the arm being secured to the torque shaft and constituting a radial slideway for a carrier for a rotary cutting head having its axis parallel to that of the torque shaft, the arm being provided with means for selectively moving the carrier lengthwise of the arm for retaining it at any desired position along the arm, and means being provided for advancing and retracting the torque shaft and the arm.

The arm provides for rectilinear movement of the rotary cutting head along the arm in any radial position to which the arm is brought about by partial rotation of the torque shaft about its axis. The arm also provides for arcuate movement of the cutting head at whatever the radial distance to which the carrier is brought along the arm and there retained. By use of these two provisions in combination, either in turn or simultaneously, the cutting head can be made to remove mineral within an area that extends horizontally to each side of the forward end of the torque shaft and upwardly from that forward end by the length of the arm as measured to the outermost part of the cutting head when the head is brought by its carrier to its limiting position at the free end of the arm.

The machine preferably has but one cutting head on the carrier, since by the use of a head of appropriate overall diameter, the whole area can be progressively covered by cuts of a width equal to that diameter, with freedom for the mineral removed to fall quickly away from the cutting head, thus minimising recirculation of the mineral by the head and the formation of excessive dust by recirculation.

According to a further important feature of the invention, the torque shaft projects forwardly from a transverse horizontal pivot, means being provided to swing the shaft about that pivot so that is axis inclines forwardly and downwardly. Preferably, the amount of swinging is such that, with the arm disposed horizontally, the underside of the cutting head on the arm is brought, by depressing the torque shaft, to the level of the bottom of the machine or even below that level, i.e., to or below the level of the floor on which the machine is supported. The area within which cutting can be effected is thus extended by the added area represented by the same horizontal arm extent to each side of the forward end of the torque shaft and the depth to which the cutter head can be depressed.

The invention therefore enables a machine having a single cutting head to be constructed for carrying out ripping only, or, with the additional provision of a depressible torque shaft, for cutting a full heading.

The machines are preferably self-advancing and retracting, e.g., by being mounted on crawler tracks, or by including hydraulic equipment for connection to an anchor point beyond the front or the rear, but preferably by being provided with two elongated floats by means of which base members of the machine frame can be lifted from the supporting surface and along which the base members can be slid before being lowered on to the supporting surface.

Two embodiments of the invention, viz., a ripping machine and a heading machine respectively, will now be described by way of example with reference to the accompanying drawings, in which.

Figure 1:
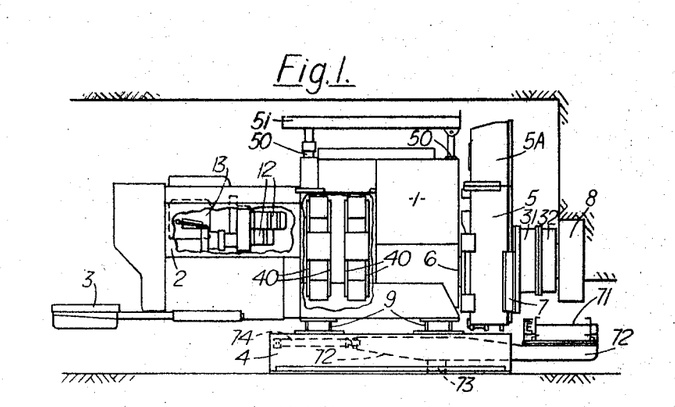
FIGURE 1 is a side elevation of a ripping machine.

Both the ripping machine and the heading machine consist essentially of a main frame 1, including a power unit 2 controlled from an operator's platform 3 at the rear, supported by two elongated base members 4 (FIGURE 2), a radial arm 5 secured to a torque shaft 6 (FIGURE 3) where the shaft protrudes from the front of the frame 1, a carrier 7 slidable along the arm 5, the carrier serving to carry a rotary cutting head 8 having its axis parallel to that of the torque shaft 6. In the ripping machine, the frame 1 is rigidly connected to the base members 4 by transverse beams 9 (FIGURES 2 and 3), so that the axis of the torque arm 6 remains horizontal, as in FIGURES 1 and 3. In the heading machine, the frame is connected by a transverse pivot 10 (FIGURES 15 and 15) to the rear of each base member 4 and is connected by a pivoted hydraulic jacking cylinder 11 to the front of each base member, so that the torque shaft 6 may be brought to an inclined position, as shown by FIGURE 15, for a purpose to be explained later.

Advantageously, the entire operation of the machines (including rotation of the cutting head 8) is effected hydraulically, from pumps 12 in the power unit 2, the pumps being driven by an electric motor 13. To avoid complication, the hydraulic pipelines from the pumps 12 to the various hydraulic devices (to be identified later) are not shown. It is, however, to be understood that electric motor or other drive is not precluded, e.g., for the rotation of the head 8, with whatever reduction gearing is necessary.

Figure 3:
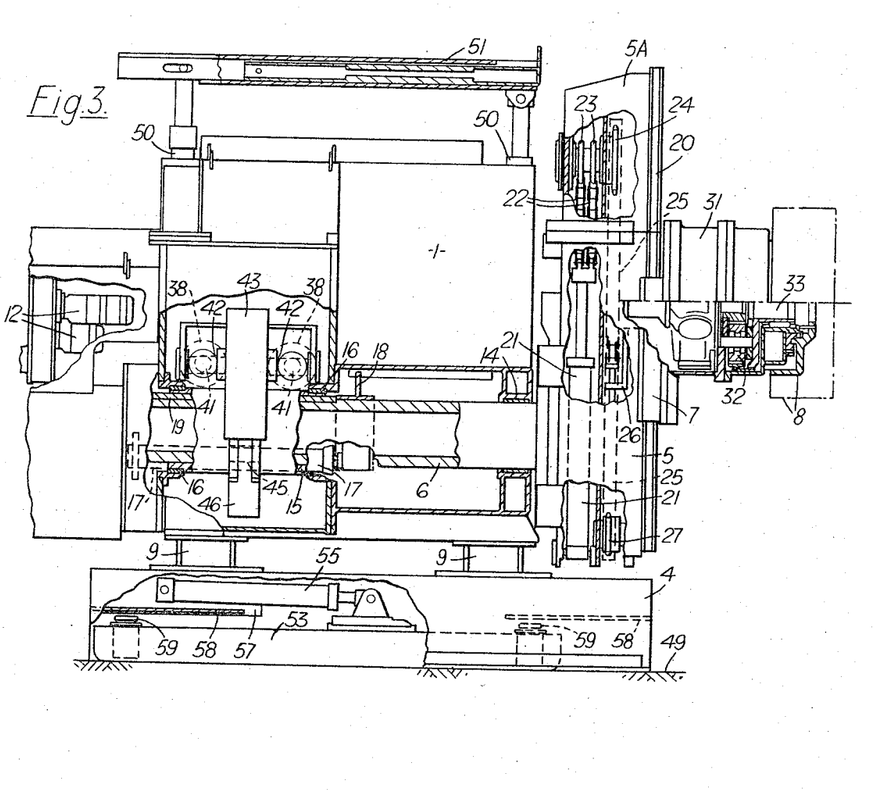
FIGURE 3 is a part-sectional side elevation, to a larger scale than FIGURE 1, with the left-hand end of FIGURE 1 omitted.

FIGURE 3 shows the torque shaft 6 supported at its front end by a bearing 14 in the frame 1 and at its rear by a surrounding torque tube 15, mounted in bearings 16, along which tube the shaft can be slid by means of a hydraulic cylinder 17 connected between the frame and a flanged collar 18 on the shaft 6. A key 19 enables the shaft 6 to be rotated by the tube 15 at all positions of the shaft, whether retracted as in FIGURE 3 or advanced beyond the front of the frame 1.

Figure 2:
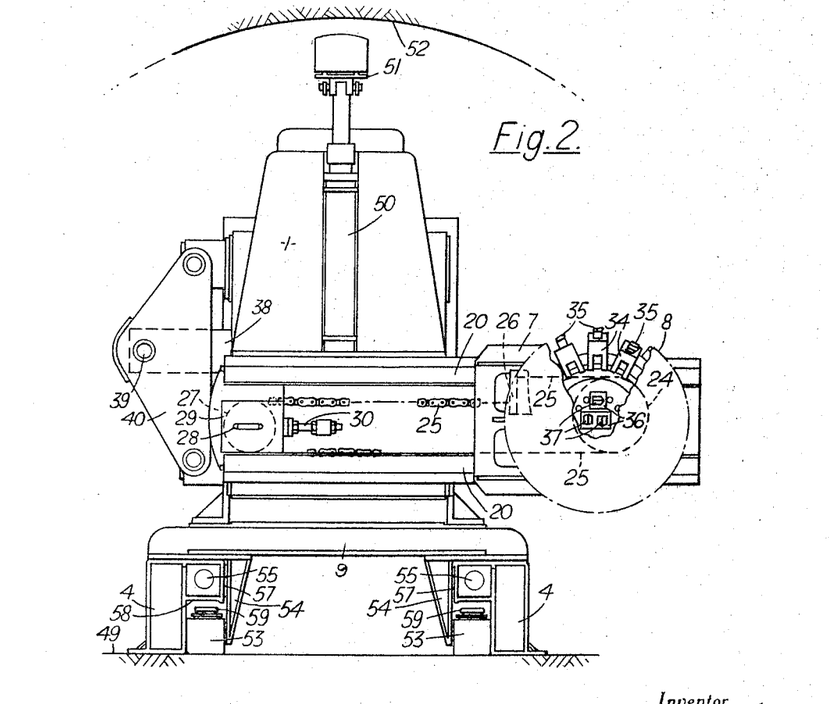
FIGURE 2 is an end elevation, to a larger scale, of the machine of FIGURE 1 as viewed from the right.

In the retracted position of the shaft 6, the radial arm 5 lies close to the frame 1, and can be swung through 180° from the extended position to the right shown in FIGURE 2, through the upright position shown in FIG- URE 3, to the corresponding extended position to the left; and, of course, the arm 5 can be similarly swung at any position to which it is advanced by the shaft 6 by operation of the cylinder 17.

The arm 5 has slideways 20 along its sides to guide the carrier 7. Inside the arm 5 are two hydraulic cylinders 21 (one only seen in FIGURE 3) connected respectively to the opposite ends of a wide chain 22 looped over two sprockets 23, so that by operation of one or other of the cylinders 21 a larger sprocket 24 driven by the sprockets 23 can be rotated in one direction or the other. One end of a chain 25 passes from the sprocket 24 to a bracket 26 projecting from the carrier 7 between the slideways 20 into the arm 5. The chain 25 runs to and round a smaller sprocket 27 to enable its other end to be connected to the bracket 26. The sprocket 27 has a slotted guide 28 in a support 29, for the chain 25 to be tensioned by adjusting means 30. The carrier may be progressively moved, in either direction, along the arm 5 by the cylinders 21, or located at any set position along the arm.

A hydraulic motor 31 mounted on the carrier 7 drives, through gearing 32, a shaft 33 to which the cutting head 8 is secured, the axis of the shaft being parallel to the axis of the torque shaft 6. The cutting head 8 is provided with generally radially directed boxes 34 to carry picks 35 for peripheral cutting along the axial length of the head, and with axially directed boxes 36 to carry picks 37 primarily to assist in cutting during advancing of the head in the direction of its axis.

Figure 4:
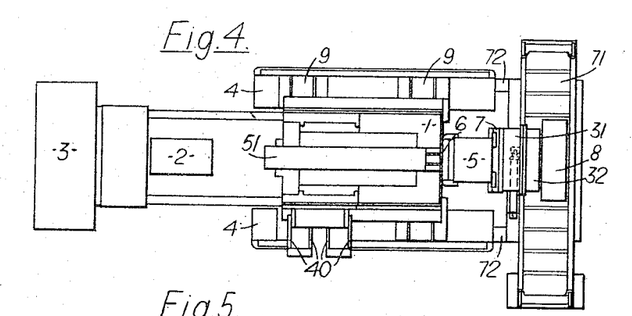
FIGURE 4 is a plan of the machine.
Figure 6:
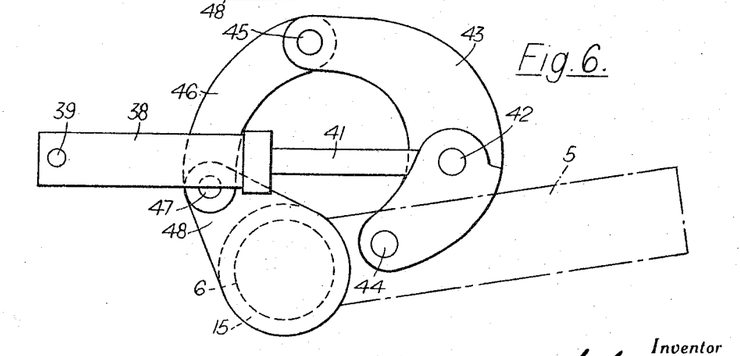
FIGURES 6, 7, and 8 are diagrams showing torque-arm operating mechanism in three positions.
Figures 7, 8:
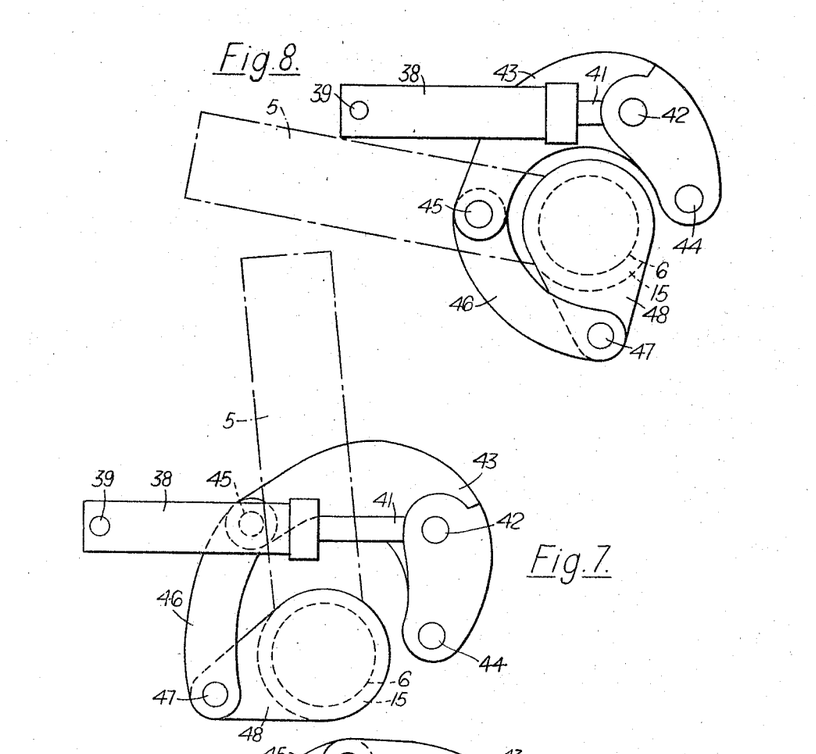

The torque shaft 6 is rotated through 180° by two hydraulic cylinders 38 pivoted at 39 each between a pair of plates 40 (FIGURES 2 and 4) secured at one side of the frame 1. The cylinders 38 lie substantially horizontally across the frame 1 above the torque shaft 6 and their piston rods 41 (FIGURES 6 to 8) are pivoted at 42 intermediately of a curved lever 43 mounted on a fixed pivot 44 in the frame. The lever 43 is pivoted at 45 to a curved link 46, pivoted at 47 to a torque arm 48 on the torque tube 15. Fully extended (FIGURE 6), the rods 41 rotate the torque shaft 6 to a position in which the arm 5 extends horizontally to the right as in FIGURE 2. Half extended (FIGURE 7), the rods 41 bring the arm 5 to the upright position of FIGURE 3. Fully retracted (FIGURE 8), the rods 41 bring the arm 5 horizontally to the left, as viewed in FIGURE 2. The curvature of the lever 43 and the links 46 enables them to embrace the torque shaft 6 closely at one end of their operative movement (FIGURE 8); and they move upwardly and outwardly (to the opposite side of the frame 1 from the plates 40) in progressively occupying all other positions, including those shown in FIGURES 6 and 7. This simple and compact hydraulically operated rotating mechanism produces a reasonable approach to uniform torque, say with 20% variation from maximum to minimum, throughout the 180° rotating movement.

The widely-spaced base members 4 (FIGURE 2), bridged by the beams 9 to which the frame 1 is secured, enable the machine to be solidly carried by the supporting surface 49, and the length of the members 4 ensures that the torque shaft 6 extends parallel to the surface 49 (shown horizontal in the drawings). To secure the machine in working position, hydraulic cylinders 50 serve to force a lengthwise beam 51 to the supporting arches (not shown) of the roof 52 of the working, the beam lying centrally above the frame 1.

The machine is self-propelled and self-steering, the base members 4 being provided with floats 53, each of which lies on the inner side of the respective base member 4 and is located laterally by depending brackets 54. The float 53 is nearly as long as the base member, and can be advanced and retracted by a hydraulic cylinder 55, pivoted at 56 inside a lateral extension 57 at the rear of the member 4 under which the float lies. At the bottom of the extension 57 is a skid plate 58; a second lateral skid plate at the front of the member 4 lies above the front end of the float 53.

Hydraulic jacks 59 at the rear and front ends of the float 53 are normally retracted, clear of the skid plates 58, so that the machine is supported by the base members 4, directly connected to the frame 1 by the beams 9. With the beam 51 lowered from its engagement with the roof 52, the jacks 59 enable the whole weight of the machine to be transferred to the floats 53. To advance the machine from the position shown in FIGURE 3, the floats 53 are advanced by the cylinders 55 to bring the jacks 59 below the front ends of the skid plates 58. The jacks then lift the machine, and the cylinders 55 are used to draw the machine forwards, the skid plates sliding over the jacks. When the machine has been advanced to the required position, the jacks 59 are retracted, so that the machine is again supported by the base members 4.

Retraction of the machine is effected by a reversal of the above sequence of operations. By operating the floats 53 to different extents, the machine can be steered.

Figure 5:
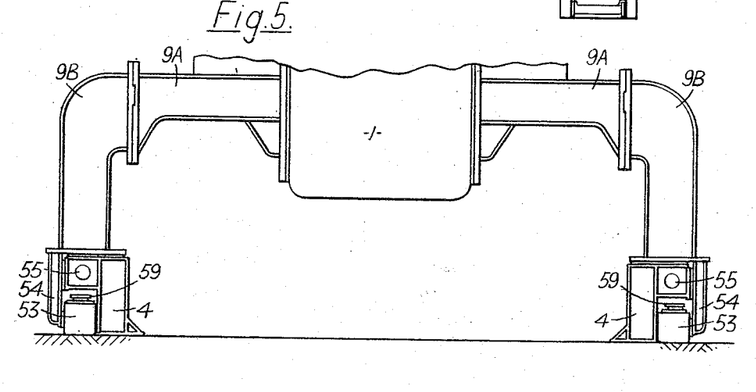
FIGURE 5 is a view, taken in the same direction as FIGURE 2, of a modified base.

In FIGURE 5, the beams 9 have been replaced by brackets 9A secured to the sides of the frame 1, and further brackets 9B complete the connections to the base members 4, which are now widely spaced to provide working access, and space for installing a conveyor, below the machine. To increase the space between the members 4, the floats 53 and the brackets 54 lie on the outside of the members.

Figure 9:
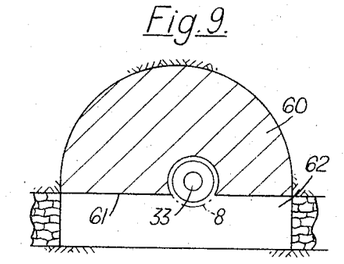
FIGURES 9, 10, 11, 12, and 13 are diagrams illustrating the operation of the above ripping machine.

When the machine has been brought to, and secured in, working position, with the torque shaft 6 retracted by the cylinder 17, so that the cutting head 8 is just clear of the face 60 to be ripped (FIGURE 9), the arm 5 is brought to horizontal position and the carrier 7 is positioned on the arm so that the head 8 is to the right of the centre of the ripping lip 61, and just above an already prepared heading 62. The head 8 is rotated by the motor 31 and the torque shaft 6 is advanced to force the head into the face to whatever depth of sumping-in (up to the full axial length of the head) the rock conditions permit.

Figure 10:
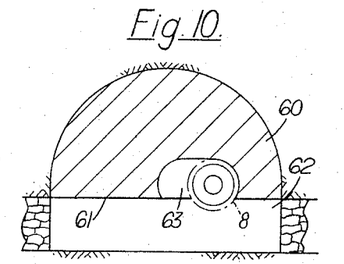
Figure 11:
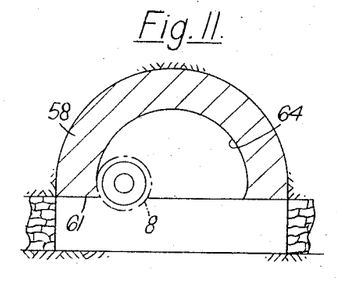
Figure 12:
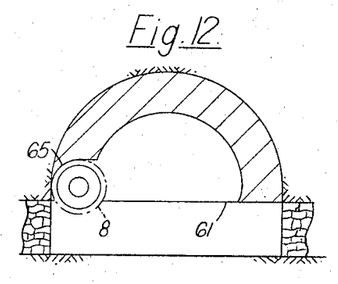
Figure 13:
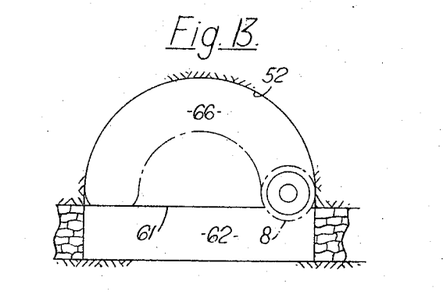

The carrier 7 is then moved to the right by the cylinders 21 to make a cut 63 (FIGURE 10) of a height into the lip 61 approaching the overall diameter of the head. Before the carrier 7 has reached its full limit of movement along the arm 5, that movement is stopped, and the arm is rotated by the cylinders 38 connected to the torque shaft 6, so as to make a semicircular sweep 64 (FIGURE 11) of the head 8 until the arm 5 has reached a horizontal position to the left. The carrier 7 is then moved further along the arm 5 so that the head 8 removes the remainder of the front of the lip 61 at the left of the face 60, as at 65 in FIGURE 12, after which the arm 5 makes a reverse semicircular sweep to remove the material 66 to the roof 52 (FIGURE 13) of the required gate-end. These operations are then repeated, for the ripping to continue to the depth to which the heading 62 has been prepared.

Although FIGURES 9 to 13 show the ripping completed by two semicircular swings of the head 8, more than two swings may be performed, depending upon the diameter of the head and the width to be ripped.

The radial length of the arm 5 is suited to the width to be ripped. As shown in FIGURE 3, the arm 5 may end in a separate part 5A. This may be replaced by a longer part, to increase the length of the arm.

After the head 8 has been sumped-in the ripping face 60 to the required depth (FIGURE 9), it is forced laterally either by a rectilinear movement (FIGURES 10 and 12) along the arm 5 by the operation of the cylinders 21, or by a sweeping movement (FIGURES 11 and 13) by the operation of the cylinders 38, so that by means of a single rotary head 8 the whole area to be ripped is removed. By adjusting the speed of the hydraulic motor 31, the cutting speed of the head 8 can be made to suit the rock conditions met at any position in the area, so that material can be removed at the optimum rate for the conditions actually met.

FIGURES 9 to 13 show the ripping completed to form a semicircular roof. However, by suitable combination of positioning or moving of the carrier 7 along the arm 5 and of swinging of the arm 5, the arched roof 52 of the gate-end produced by the ripping need not be purely arcuate.

The mineral removed during the ripping can be disposed of as required. Thus, it may be received on a conveyor 71 mounted across the front of the machine in the position shown in FIGURES 1 and 4 (the conveyor being omitted from FIGURES 2 and 3). The conveyor 71 is carried by two beams 72, one along each base member 4, with which they make sliding support at 73. A hydraulic cylinder 74 enables each beam to be advanced and retracted, so that the conveyor 71 can be made to lie below the cutting head 8 at whatever the distance the head is advanced from the front of the machine. By interconnecting the cylinder 17, i.e., the cylinder by which the torque shaft 6, arm 5, and cutting head 8 are advanced and retracted, and the two cylinders 74, the conveyor 71 is similarly advanced and retracted, and thus automatically positions itself below the head 8. The material removed by the head is thus discharged on to a conveyor along one side of the machine, or it may be directed to a pneumatic stower. Again, it may be removed by a scraper packing bucket for direct stowage.

Figure 14:
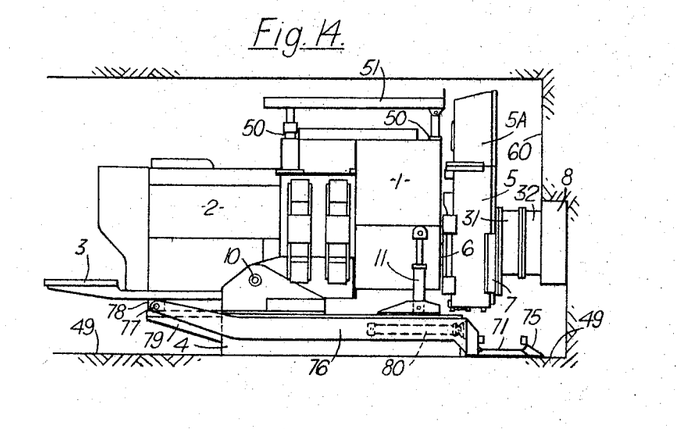
FIGURE 14 is a side elevation of a heading machine.
Figure 15:
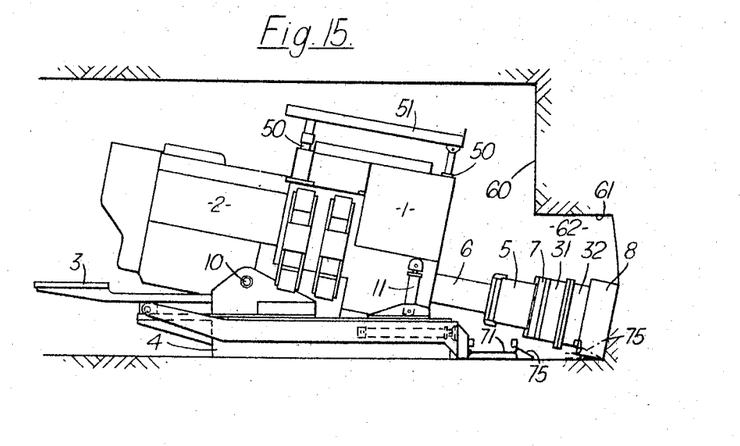
FIGURE 15 shows the machine of FIGURE 14 in a different operative position.
Figure 16:
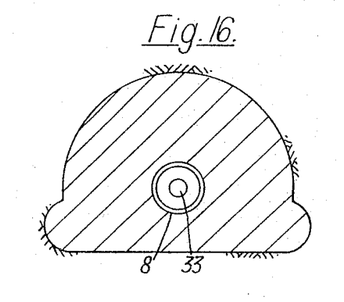
FIGURES 16, 17, 18, 19, and 20 are diagrams illustrating the operation of the heading machine of FIGURES 14 and 15.
Figure 17:
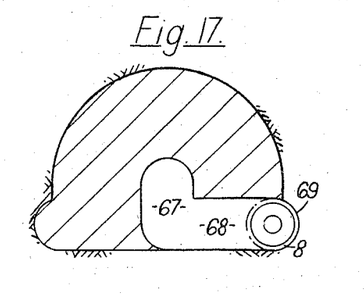
Figure 18:
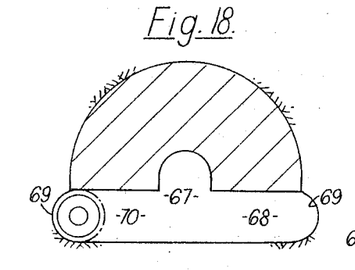

The heading machine of FIGURES 14 and 15 is able to perform a ripping operation exactly as described above with reference to the ripping machine, when the torque shaft 6 is brought horizontal, as in FIGURE 14, by the operation of the hydraulic cylinders 11 to rock the frame 1 about the pivot 10. However, because the frame 1 can rock, the torque shaft 6 can be depressed, as in FIGURE 15, to bring the cutting head 8 down to the floor 49 on which the machine stands, or even low enough to cut into the floor. This enables a space 60 to be cut first into coal underlying the rock behind the face 58 to be subsequently ripped. Starting with the arm 5 horizontal and the torque shaft 6 also horizontal, and the cutting head 8 co-axial, or substantially so, with the torque shaft, the cutting head may be first sumped-in (FIGURE 16), and then the torque shaft forcibly depressed to cause the cutting head to remove material 67 (FIGURE 17) down to floor level or below. The carrier 7 is then driven along the arm 5, so that the traversing cutting head 8 cuts material 68 to one side of the heading, and preferably effects an undercut 69, to provide clearance for the later positioning of the foot of an arch. The head 8 is returned towards the torque shaft, which is then raised to enable the arm 5 to be swung through 180°, after which the torque shaft is lowered to position the head 8 for movement towards the other side of the heading to remove material 70 (FIGURE 18) and to form another undercut 67. This sequence of operations may be repeated (with appropriate depression of the torque shaft 6) until the desired height of the space 60 has been reached, as will be apparent from FIGURE 15, where the diameter of the head 8 is less than the height of the space; and the sequence may then be repeated in toto to drive the space 60 to the required depth.

Figure 19:
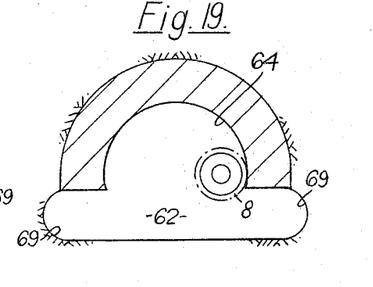
Figure 20:
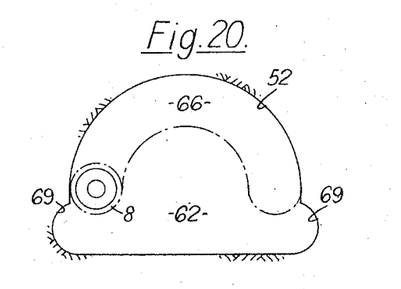

The torque shaft 6 is now brought to the horizontal, and a sequence of operations performed much as in FIGURES 9 to 13, these having been simplified in FIGURES 19 and 20 to show first and second semicircular sweeps 64 and 66 of the head 8 in the completion of the entire section of the gate-end by combined operation of heading and ripping with the one machine.

For the disposal of coal removed from the heading, the machine of FIGURES 14 and 15 is provided with a transverse pusher plate 75 disposed at floor level in front of a transverse conveyor 71, which in this case is mounted on two arms 76, one along each base member 4, the arms being pivotally supported at 77 at their rear ends in sliders 78 movable along brackets 79. A cylinder 80 enables each arm 76 to be advanced and retracted, thus pushing or pulling the conveyor 71 and the pusher plate 75 on the floor 49 in front of the machine. They are held retracted during each cut into the heading 62 and then, with the cutting head 8 raised, they are advanced, to push the coal up the pusher plate 75 on to the conveyor 71, and so on over the desired depth of the heading, until all the coal cut from the heading has been removed.

The conveyor 71 then remains advanced while the cutting head 8 operates to form the arched gate-end, so as to receive the rock then cut from above the ripping lip 61, the rock falling directly on to the conveyor, for disposal separately from the coal previously cut from the heading 62.

The machines as above described, and this applies particularly in the case of the heading machine, may be used in the mining of minerals other than coal.

What I claim is:

1. A mining machine comprising a frame, a torque shaft located inside the frame extending lengthwise of and protruding at one end from the front end of the frame, a torque arm secured to the protruding end of the torque shaft and extending radially from the shaft, a slideway lengthwise of the radial arm, a carrier slidably mounted on the slideway, a rotary cutting head mounted on the carrier for rotation about an axis parallel to that of the torque shaft, means for advancing and retracting the torque shaft with respect to the frame, means for rotating the torque shaft and the radial arm about the axis of the torque shaft, and means for moving the carrier and the cutting head along the radial arm.

2. A mining machine as in claim 1, comprising elongated base members by which the frame is supported and to which it is rigidly connected, and bearings in the frame in which the torque shaft is rotatable, with its axis maintained horizontal.

3. A mining machine as in claim 1, comprising elongated base members by which the frame is supported and to which it is rigidly connected, a forward bearing in the frame for the torque shaft, and a torque tube surrounding the torque shaft rearwardly of the forward bearing and itself rotatably mounted in the frame, the torque shaft being rotatably engaged to the torque tube and yet free to move lengthwise with respect to the tube, and the means for rotating the torque shaft being connected to the torque tube to rotate the shaft by means of the tube.

4. A mining machine as in claim 1, comprising elongated base members on which the frame is carried, an elongated float along each base member, skid plates on each base member above the front and rear of its float, hydraulic jacks carried by the float below the respective skid plates, and hydraulic cylinders for moving the floats lengthwise of the base members when the jacks are lowered and for sliding the base members and the frame lengthwise of the floats when the jacks are raised to transfer the weight of the machine to the floats.

5. A mining machine as in claim 1, comprising elongated base members by which the frame is supported and to which it is rigidly connected, a sliding beam along each base member, a transverse conveyor carried by the beams across the front of the frame, and hydraulic cylinders for advancing and retracting the beams and the conveyor carried by them.

6. A mining machine as in claim 5, comprising a hydraulic cylinder as the means for advancing and retracting the torque tube, said hydraulic cylinder being interconnected with the hydraulic cylinders for operating the beams so that the conveyor is advanced and retracted simultaneously with the torque tube.

7. A mining machine as in claim 1, comprising elongated base members, a transverse pivotal connection between the base members and the frame, means for rocking the frame about the transverse pivot to bring the torque tube from a substantially horizontal position to any desired forwardly depressed position, an arm extending along and transversely pivoted rearwardly of each base member on pivots slidable lengthwise of the base member, a transverse conveyor connected across the fronts of the arms, and means to advance and retract the arms and the conveyor with respect to the bottom of the space in front of the machine in which the radial arm, the carrier, and the cutting head can be variously positioned by the rocking of the frame on the base members and the consequential positioning of the torque shaft.

8. A mining machine as in claim 7, wherein an inclined pusher plate is carried forwardly of the conveyor, so as to force on to the conveyor during an advancing movement of the conveyor material cut by the rotary cutting head and deposited in advance of the conveyor.

9. A mining machine comprising a frame, elongated base members, a transverse pivotal connection between the base members and the frame, means for rocking the frame about the transverse pivot from a substantially horizontal position to any desired forwardly depressed position, a torque shaft extending lengthwise of and protruding at one end from the front end of the frame, a torque arm secured to the protruding end of the torque shaft and extending radially from the shaft, a slideway lengthwise of the radial arm, a carrier slidably mounted on the slideway, a rotary cutting head mounted on the carrier for rotation about an axis parallel to that of the torque shaft, means for advancing and retracting the torque shaft with respect to the frame at any position to which the frame is brought by the rocking means, means for rotating the torque shaft and the radial arm about the axis of the torque shaft, and means for moving the carrier and the cutting head along the radial arm.

10. A mining machine as in claim 9, comprising a forward bearing in the frame for the torque shaft, and a torque tube surrounding the torque shaft rearwardly of the forward bearing and itself rotatably mounted in the frame, the torque shaft being rotatably engaged to the torque tube and yet free to move lengthwise with respect to the tube, and the means for rotating the torque shaft being connected to the torque tube to rotate the shaft by means of the tube.

References Cited by the Examiner

UNITED STATES PATENTS

| | | | |
|---|---|---|---|
| 556,985 | 3/1896 | Hurd | 299—61 |
| 956,463 | 4/1910 | Wittich | 175—122 X |
| 2,998,964 | 9/1961 | Morlan | 299—86 |
| 3,013,784 | 12/1961 | Osgood | 299—60 |

FOREIGN PATENTS 849,833  9/1952  Germany.

ERNEST R. PURSER, *Primary Examiner.*